US007328494B2

(12) United States Patent
Kitagawa et al.

(10) Patent No.: US 7,328,494 B2
(45) Date of Patent: Feb. 12, 2008

(54) DRIVING TOOL HAVING PISTON AND DRIVER BLADE

(75) Inventors: Hiroki Kitagawa, Hitachinaka (JP); Takuhiro Murakami, Hitachinaka (JP)

(73) Assignee: Hitachi Koki Co., Ltd., Tokyo (JP)

(*) Notice: Subject to any disclaimer, the term of this patent is extended or adjusted under 35 U.S.C. 154(b) by 0 days.

(21) Appl. No.: 11/604,350

(22) Filed: Nov. 27, 2006

(65) Prior Publication Data

US 2007/0067980 A1 Mar. 29, 2007

Related U.S. Application Data

(62) Division of application No. 10/852,122, filed on May 25, 2004, now abandoned.

(30) Foreign Application Priority Data

May 26, 2003 (JP) .......................... P2003-148441
Mar. 23, 2004 (JP) .......................... P2004-085368

(51) Int. Cl.
*B23P 11/00* (2006.01)
*B25C 5/00* (2006.01)

(52) U.S. Cl. .................. 29/525.14; 227/156; 227/130; 173/1

(58) Field of Classification Search ................ 227/120, 227/130, 156, 107, 114, 119, 139; 173/1, 173/171; 228/200, 244-255; 29/525.14
See application file for complete search history.

(56) References Cited

U.S. PATENT DOCUMENTS 2,687,522 A 8/1954 Juilfs
2,751,940 A 6/1956 Miller
2,979,725 A 4/1961 Wandel
3,043,272 A 7/1962 Wandel
3,301,456 A 1/1967 Werner (Continued)

FOREIGN PATENT DOCUMENTS

GB 2 249 116 4/1992

(Continued)

OTHER PUBLICATIONS

"The Principles of Brazing", distributed by BrazeTec GmbH, www.BrazeTec.com.*

*Primary Examiner*—Rinaldi I. Rada
*Assistant Examiner*—Paul Durand
(74) *Attorney, Agent, or Firm*—Antonelli, Terry, Stout & Kraus, LLP.

(57) ABSTRACT

A method for fixing a driver blade to a piston of a fastener driving tool having a housing, a cylinder, a piston having a piston body and a boss with a groove, extending in the axial direction, and a driver blade having a pair of protrusions. The method includes positioning the driver blade above the piston body, inserting the driver blade into the groove in order to form an assembly of the driver blade and the piston, supplying a brazing metal onto boundary positions between the protrusions and the boss, and heating the assembly at a temperature above a melting point of the brazing metal so that molten brazing metal is flowed downwardly into spaces between the boss and the driver blade and the driver blade becomes fixed to the piston by brazing with the brazing metal.

11 Claims, 3 Drawing Sheets

U.S. PATENT DOCUMENTS

| | | | |
|---|---|---|---|
| 3,601,303 | A | 8/1971 | Leach |
| 4,605,073 | A | 8/1986 | Nilsson |
| 4,715,203 | A | 12/1987 | Wiegenstein |
| 5,079,983 | A | 1/1992 | Bruhn |
| 5,586,990 | A | 12/1996 | Hahnen |
| 6,434,946 | B1 | 8/2002 | Shaw |

FOREIGN PATENT DOCUMENTS

| | | |
|---|---|---|
| JP | 9-109056 | 4/1997 |
| TW | 491145 | 6/2002 |

* cited by examiner

DRIVING TOOL HAVING PISTON AND DRIVER BLADE

CROSS REFERENCE TO RELATED APPLICATION

This application is a divisional application of U.S. application Ser. No. 10/852,122, filed May 25, 2004, now abandoned the contents of which are incorporated herein by reference.

BACKGROUND OF THE INVENTION

The present invention relates to a driving tool for driving a fastener into a workpiece such as a wood building material.

A driving tool generally includes a driver blade extending from a piston reciprocally movable in a cylinder. A pneumatic pressure is applied to the piston, so that the driver blade is moved toward a workpiece such as a timber for driving a fastener such as a staple and a nail thereinto.

Laid open Japanese Patent Application Publication No. H09-109056 discloses a fixing structure of a driver blade to a piston. As shown in FIGS. 7 and 8, a piston 207 includes a piston body 207A and a boss 207B extending from one side of the piston body 207A toward a fastener driving direction. The boss 207B is formed with a fitting groove 207*a* extending in an axial direction of the boss 207B for fitting an upper region of a plate like driver blade 208. The boss 207B is also formed with a shaft hole 207*b* extending in a diametrical direction thereof. Further, the driver blade 208 is formed with a shaft hole 208*a* in alignment with the shaft hole 207*b* when the driver blade 208 is completely fitted into the fitting groove 207*a*. A shaft 209 extends through the shaft holes 207*b* and 208*a* thereby fixing the driver blade 208 to the piston 207. Incidentally, in FIGS. 5 and 6, a reference numeral 11 designates a piston ring assembled in a piston ring groove 107*a*.

With such a conventional arrangement, the piston 207 and the driver blade 208 are subjected to machining for forming the shaft holes 207*b* and 208*a* and the shaft 209 is required for the mechanical connection, thereby increasing production cost and mechanical components. Further, local stress is imparted on the shaft 209, and shaft holes 207*b*, 208*a* due to load incurred by the fastener driving operation. Therefore, the shaft 209 may be broken and the shaft holes may be deformed. Furthermore, accurate alignment must be provided between the shaft holes 207*b* and 208*a* in order to allow insertion of the shaft 209 therethrough. To this effect, additional jig must be required in order to hold the piston 207 and the driver blade 208 at the alignment position. This lowers assembleability of the piston 207 and the driver blade 208.

SUMMARY OF THE INVENTION

It is an object of the present invention to overcome the above-described problems and to provide an improved fastener driving tool providing enhanced assembleabity while reducing mechanical components and capable of providing a sufficient mechanical strength without generation of local stress and without degradation of materials due to excessive heat application.

This and other objects of the present invention will be attained by a fastener driving tool including a housing, a cylinder, a piston, and a driver blade. The cylinder is supported to the housing. The piston is reciprocally movable in the cylinder in an axial direction of the cylinder. The driver blade is fixed to the piston and extends therefrom in the axial direction. The driver blade is fixed to the piston by brazing with a brazing material.

DETAILED DESCRIPTION OF THE PREFERRED EMBODIMENTS

Figure 1:
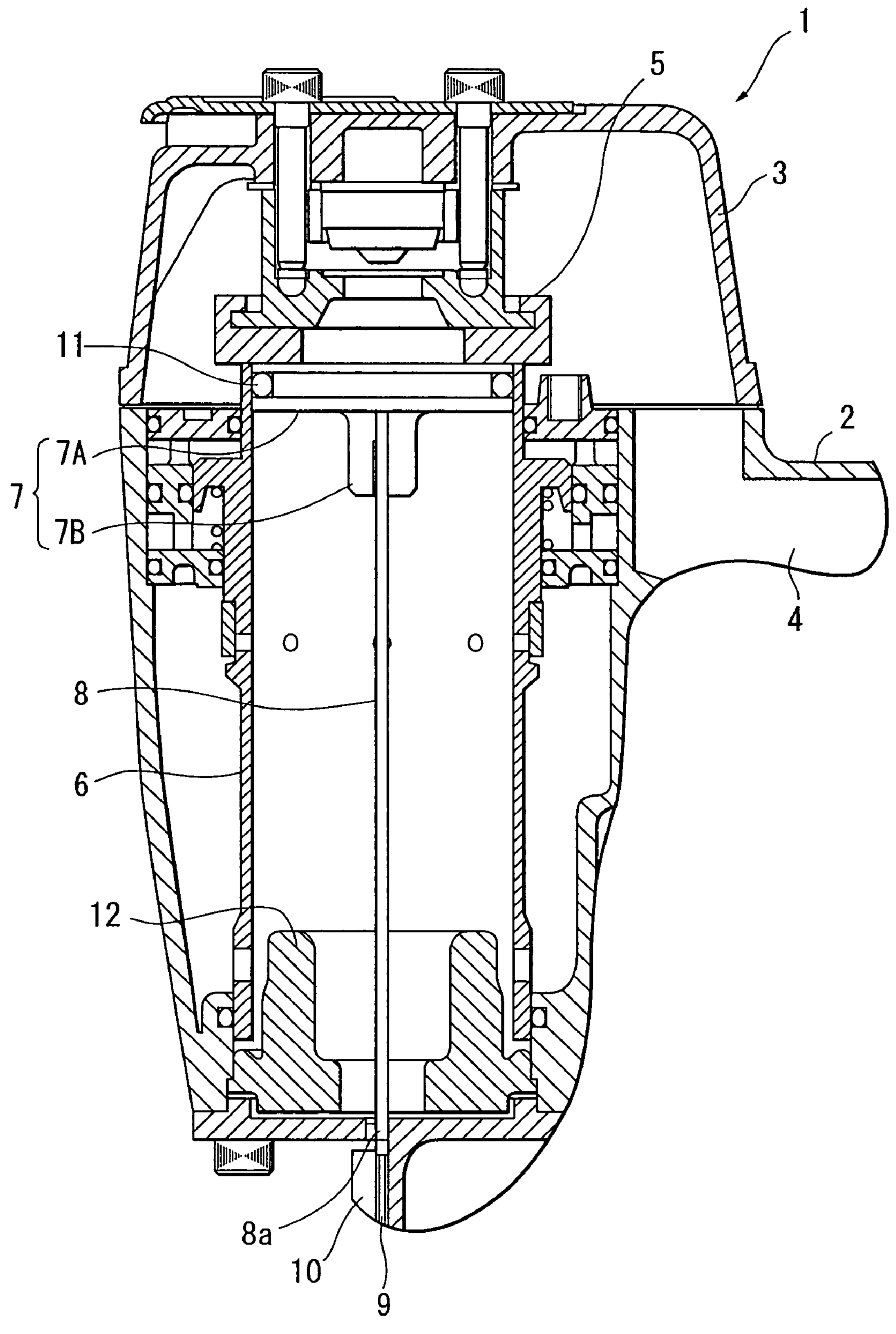
FIG. 1 is a partial cross-sectional side view showing a fastener driving tool according to one embodiment of the present invention.

A fastener driving tool according to one embodiment of the present invention will be described with reference to FIGS. 1 through 4. A fastener driving tool 1 includes a main housing 2 and a head housing 3. The main housing 2 is fluidly connected to a compressor (not shown) through a hose (not shown), and internal spaces of the main housing 2 and the head housing 3 function as a compressed air chamber 4 in which a compressed air supplied from the compressor is accumulated.

In the head housing 3, a head valve 5 is provided, and in the main housing 2, a cylinder 6, a piston 7 and a driver blade 8 are provided. The cylinder 6 is supported to the main housing 2 and extends in a longitudinal direction of the main housing 2. The piston 7 is reciprocally movable in the cylinder 6. The compressed air pressure can be applied to an upper surface of the piston 7 in a conventional manner. The driver blade 8 extends from a lower side of the piston 7 and a lowermost end 8*a* of the driver blade 8 is abuttable on a fastener 9 successively positioned to a fastener injection section 10. A bumper 12 to which the piston 7 is abuttable is disposed at a lower side of the main housing 2 for absorbing kinetic energy of the piston 7.

Figure 2:
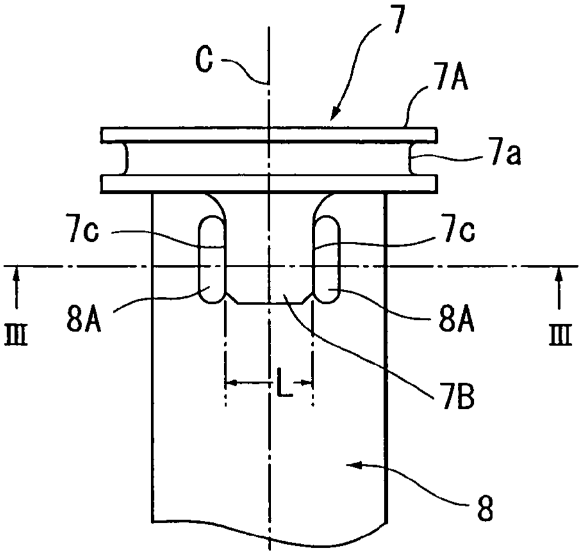
FIG. 2 is a front view showing an assembling state of a piston and a driver blade in the fastener driving tool according to the embodiment of the present invention.
Figure 3:
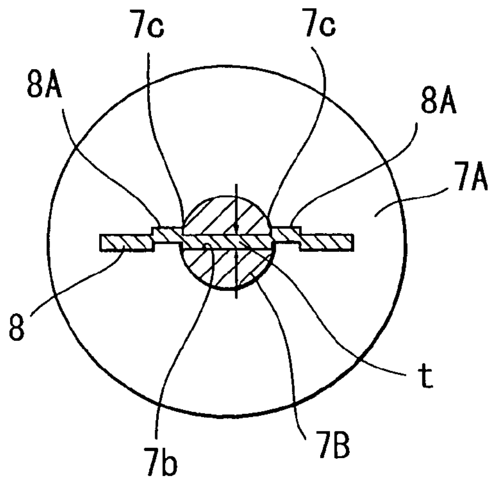
FIG. 3 is a cross-sectional view taken along the line III-III of FIG. 2.
Figure 4:
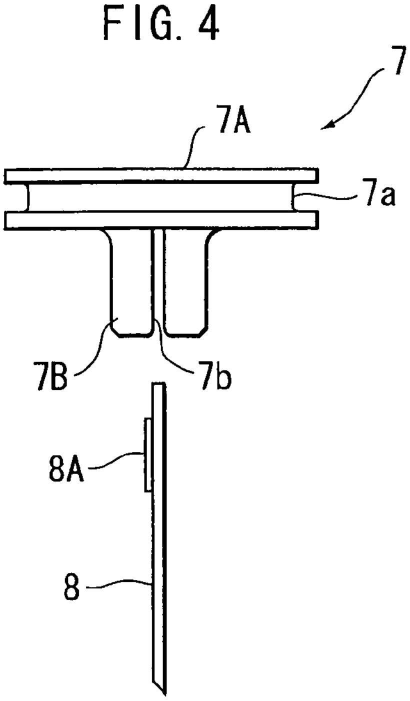
FIG. 4 is a side view showing a disassembly of the piston and the driver blade in the fastener driving tool according to the embodiment of the present invention.

As shown in FIGS. 2 through 4, the piston 7 includes a piston body 7A made from a metal such as iron and a boss 7B integrally extending from a lower center portion of the piston body 7A and made from a metal such as iron. The piston body 7A has a disc like configuration and is formed with a piston ring groove 7*a* at an outer peripheral surface into which a piston ring 11 is accommodated. The boss 7B has a cylindrical shape and is formed with a fitting groove 7*b* extending in an entire axial length of the boss 7B and crossing in a diametrical direction thereof.

The driver blade 8 has a generally rectangular plate like shape and has a thickness "t" fittable into the fitting groove 7*b*. The driver blade 8 is also made from a metal such as iron. An upper end face of the driver blade 8 is in contact with the lower surface of the piston body 7A, when the driver blade 8 is fully inserted into the fitting groove 7*b*. An upper region of the driver blade 8 is provided with a pair of protrusions 8A, 8A extending in a longitudinal direction of the driver blade 8 and at positions corresponding to sides of the boss 7B. The protrusions 8A, 8A are positioned symmetrically with respect to a center line C of the driver blade 8. A distance L between confronting walls of the protrusions 8A and 8A is substantially equal to an outer diameter of the boss 7B. Thus, the protrusions 8A, 8A function as guides or positioning sections for facilitating positioning of the driver blade 8 with respect to the fitting groove 7*b*, i.e., to the piston body 7A when the driver blade 8 is inserted into the fitting groove 7*b* while the protrusions 8A, 8A are in sliding contact with open ends 7*c* of the boss 7B, the open ends 7*c* extending in the longitudinal direction of the boss 7B.

Brazing will next be described. A conveyer is provided on which the piston body 7A is mounted in such a manner that the driver blade 8 assembled into the boss 7B is positioned above the piston body 7A. A brazing filler metal such as copper paste is adhered onto boundary positions between the protrusions 8A and the boss 7B. While conveying the assembly on the conveyer, the assembly passes through a brazing station where the assembly is heated to a temperature above a melting point of the brazing material such as not less than 1100° C. By this heating, the copper paste becomes molten state and are flowed downwardly into minute spaces between the piston 7 and the driver blade 8 because of a capillary action, that is, between the piston body 7A and the end face of the driver blade 8, between the boss 7B and the driver blade 8 (inside the fitting groove 7*b*), and between the boss 7B and the protrusions 8A. Because of the provisions of the pair of protrusions 8A, 8A, a contacting area between the piston 7 and the driver blade 8 can be increased thereby increasing bonding strength.

After brazing, heat treatment such as a quenching is performed to the assembly of the piston 7 and the driver blade 8 at a temperature ranging from 800 to 900° C. lower than the brazing temperature in order to remove residual stress from the piston 7 and the driver blade 8. Therefore, the brazing material is free from melting at the heat treatment to maintain fixed bonding between the piston 7 and the driver blade 8.

Figure 5:
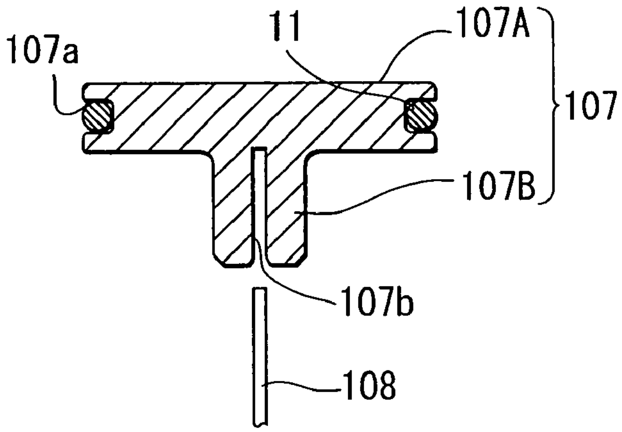
FIG. 5 RELATED ART
FIG. 5 is a cross-sectional view showing a disassembling state of a piston and a driver blade according to a related art.
Figure 6:
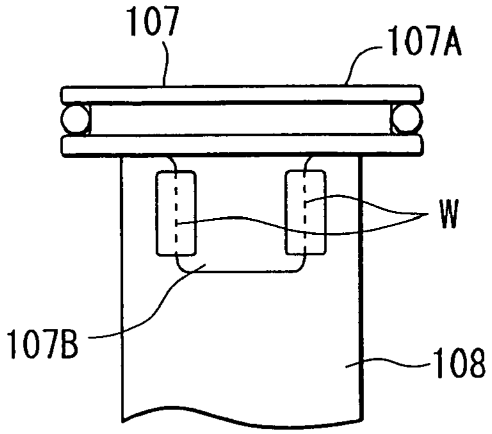
FIG. 6 RELATED ART
FIG. 6 is a front view showing an assembled state of the piston and the driver blade according to the related art.
Figure 7:
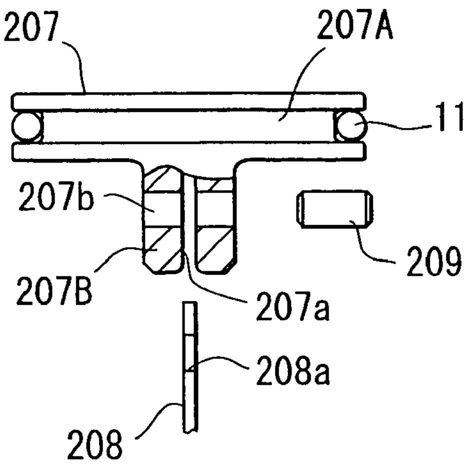
FIG. 7 PRIOR ART
FIG. 7 is a partial cross-sectional side view showing a piston and a driver blade according to a conventional driving tool.
Figure 8:
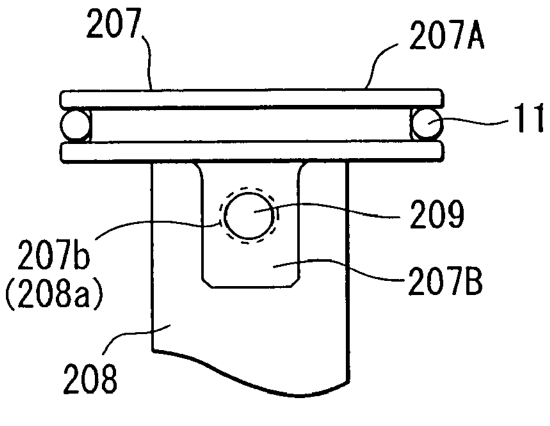
FIG. 8 PRIOR ART
FIG. 8 is a front view showing an assembled state of the piston and the driver blade according to the conventional driving tool.

The fixing construction according to the present embodiment is advantageous over a comparative welding as shown in FIGS. 5 and 6. In a comparative example, protrusions corresponding to the protrusions 8A are not provided in a driver blade 108. The driver blade 108 is inserted into a fitting groove 107*b* of a boss 107B integrally with a piston body 107A. Then, welding is performed to areas W at boundary regions between the driver blade 108 and open ends of the fitting groove 107*b* opened at an outer peripheral surface of the boss 107B. With this arrangement, bonding strength between the driver blade 108 and the piston 107 depends on welding area. Further, materials of the driver blade 108 and the piston 107 may be degraded due to application of high welding temperature to the local areas thereby lowering mechanical strength. Moreover, positioning of the driver blade 108 to the boss 107B is unstable.

In contrast, in the present embodiment, application of local heat to the piston 7 and the driver blade 8 can be prevented with the employment of brazing. That is, entire piston 7 and the driver blade 8 are heated at the brazing station. Further, the positional relationship between the piston 7 and the driver blade 8 can be maintained easily by the protrusions 8A without any employment of additional jigs thereby enhancing assembleability. Thus, the resultant piston-driver blade arrangement having high mechanical strength can be produced at a low cost with reduced mechanical components.

While the invention has been described in detail with reference to specific embodiments thereof, it would be apparent to those skilled in the art that various changes and modifications may be made therein without departing from the spirit and scope of the invention.

For example, a shape of the protrusions 8A is not limited to the above-described embodiment, but various shape is conceivable as long as the protrusions functions as positioning elements for positioning the driver blade to the boss 7B. Further, in the above-described embodiment, a pair of protrusions 8A, 8A are provided. However, only one protrusion is available, because positioning of the driver blade to the boss can still be achieved by maintaining contact of the protrusion with the open end 7*c* during assembly. Moreover, a shape of the boss 7B is not limited to the above-described embodiment, but various cross-sectional shape is conceivable.

What is claimed is:

1. A method for fixing a driver blade to a piston of a fastener driving tool which comprises:

a housing;

a cylinder supported to the housing and having an axis providing an axial direction, the piston including a piston body and a boss integrally extending from the piston body in the axial direction, the boss being formed with a groove extending in the axial direction; and a driver blade having a pair of protrusions extending in the axial direction and spaced away from each other by a distance;

wherein the method comprises the steps of:

positioning the driver blade above the piston body;

inserting the driver blade into the groove of the boss so that the protrusions which extend in the axial direction are positioned so as to face an outer surface of the boss which extends in the axial direction in order to form an assembly of the driver blade and the piston;

supplying a brazing metal onto boundary positions between the protrusions and the boss; and heating the assembly at a temperature above a melting point of the brazing metal so that molten brazing metal is flowed downwardly into spaces between the boss and the driver blade and the driver blade becomes fixed to the piston by brazing with the brazing metal.

2. The method as claimed in claim 1, further comprising a step of quenching the assembly at a temperature lower than the temperature of the melting point of the brazing metal.

3. The method as claimed in claim 2, wherein the brazing metal is copper.

4. The method as claimed in claim 1, wherein the brazing metal is copper.

5. The method as claimed in claim 1, wherein the step of inserting the driver blade into the groove includes utilizing the protrusions of the driver blade as a guide with respect to the outer surface of the boss to enable insertion of the driver blade into the groove of the boss.

6. The method as claimed in claim 5, wherein the protrusions are offset with respect to a plane of a portion of the driver blade which is inserted into the groove of the boss, the protrusions not being insertable into the groove of the boss.

7. The method as claimed in claim 1, wherein the protrusions are offset with respect to a plane of a portion of the driver blade which is inserted into the groove of the boss, the protrusions not being insertable into the groove of the boss.

8. The method as claimed in claim 1, wherein the pair of protrusions are spaced the distance away from each other which is substantially equal to an outer diameter of the boss.

9. A method for fixing a driver blade to a piston of a fastening driving tool which comprising:

a housing;

a cylinder disposed in the housing and defining an axial direction;

a piston slidable disposed in the cylinder, the piston including a piston body and a boss integrally connected with the piston body, the boss being of a column shape extending from the piston body in the axial direction and having a circular end surface, the boss having a groove passing through a diameter of the circular end face and extending in the axial direction of the boss; and a driver blade having a flat portion and a pair of protrusions protruding in a direction perpendicular to a surface of the flat portion and spaced away from each other by a predetermined distance;

wherein the method comprises the steps of:

positioning the driver blade above the piston body;

inserting the flat portion of the driver blade into the groove of the boss by utilizing the protrusions as a guide for insertion so that side surfaces of the protrusions are positioned to face an outer surface of the boss which extends in the axial direction in order to form an assembly of the driver blade and the piston;

supplying a brazing metal onto boundary positions between the protrusions and the boss; and heating the assembly at a temperature above a melting point of the brazing metal so that molten brazing metal is flowed downwardly along both a space between the groove of the boss and the flat portion of the driver blade and a space between side surfaces of the protrusions and the outer surface of the boss.

10. The method as defined in claim 9, wherein the pair of protrusions are spaced by a distance which is substantially equal to the diameter of the circular end face of the boss.

11. The method as defined in claim 9, wherein the brazing metal is copper.

* * * * *